3,211,587
NICKEL ELECTRODE FOR ELECTROCHEMICAL
CELL
Robert C. Shair, Fords, and Harvey N. Seiger, East Brunswick, N.J., assignors to Gulton Industries, Inc., Metuchen, N.J., a corporation of New Jersey
Filed Jan. 4, 1962, Ser. No. 164,310
10 Claims. (Cl. 136—28)

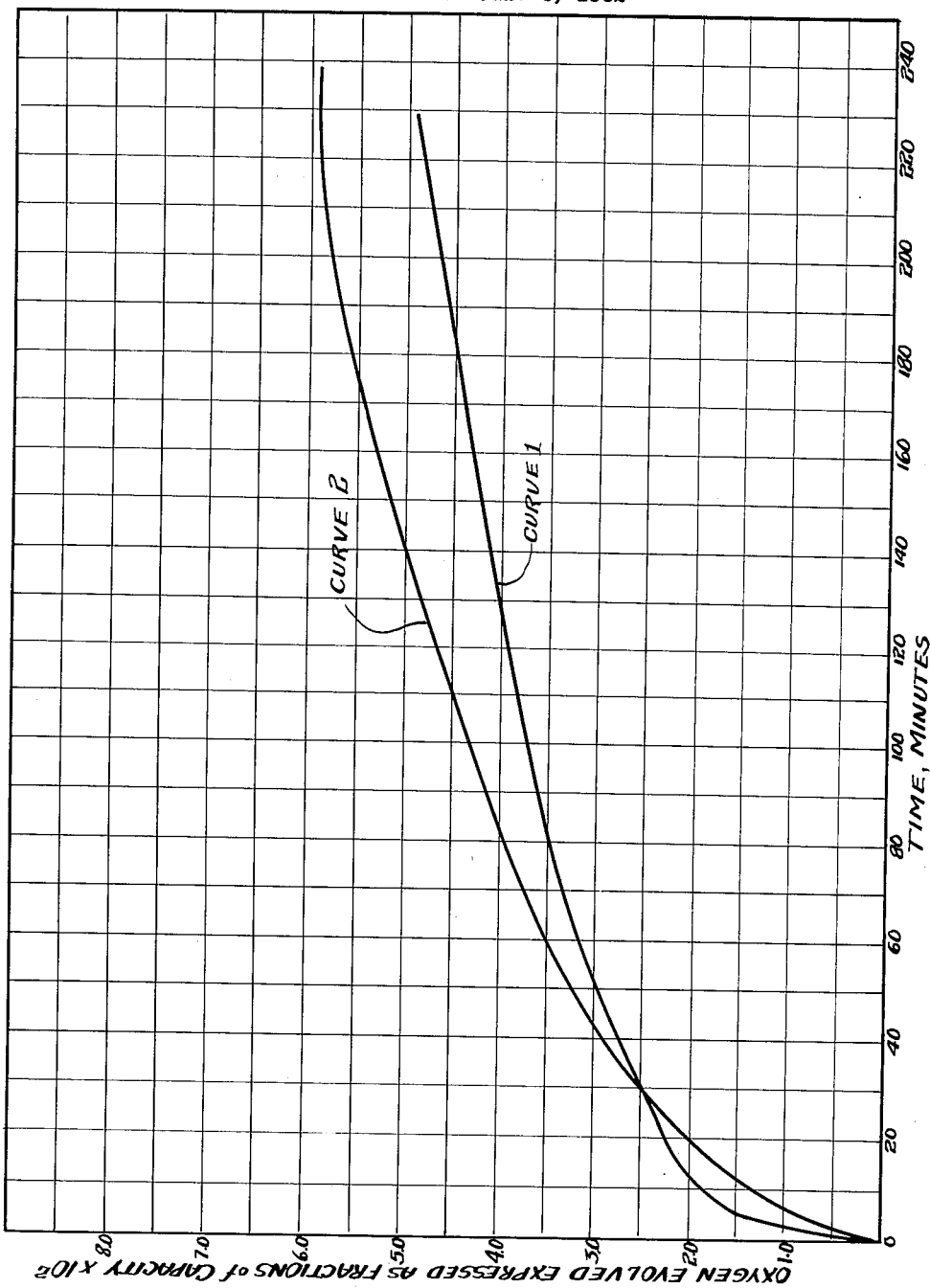

This invention relates to a new and improved nickel electrode for an electrochemical cell, particularly for use in alkaline cells, and to a process of making such an electrode.

The active material in the typical nickel electrode is a hydrated oxide of trivalent nickel. It is known that, by reason of the activity of the material of which it is constituted, such an electrode loses capacity and distintegrates, a phenomenon more commonly referred to as self-discharge.

The changes that occur in the active material of a conventional nickel electrode during self-discharge are not so far as is known completely understood. It is apparent, however, that the phenomenon involves a change in the active material from a state of higher valence to one of lower valence, the reduction being manifested by a concurrent evolution of gaseous oxygen.

The decay in capacity of standard nickel electrodes resulting from self-discharge materially affects the serviceability of electrochemical cells in which they find utility. This is particularly true in the case of electrochemical cells of the long life type which are destined not for cycle service but for standpoint or reserve purposes. These cells are usually employed as the auxiliary power sources for emergency lighting systems, telephone equipment and the like. Generally, it is necessary with such cells to pass a trickle charge, at a substantially steady voltage either intermittently or constantly, through the cells to replenish the losses resulting therein from local action in order to maintain the cells in a fully charged condition at all times.

It is an object of the present invention to provide a nickel electrode in which the rate at which self-discharge occurs is substantially reduced.

It is also an object of this invention to provide a process of making a nickel electrode having a substantially reduced rate of self-discharge.

Other objects and advantages of this invention will become apparent as the description proceeds.

Generally speaking, the invention involves the discovery that the addition of a quantity of a barium compound to the potentially active material namely, a compound of nickel, substantially reduces the rate at which capacity decay by way of self-discharge occurs in a nickel electrode; and, in addition, involves the provision of a method of producing a nickel electrode with the barium compound incorporated therein.

The supporting structure for the electrodes of this invention may be produced in any manner known in the art and may take any desired form or shape. A particularly suitable carrier, or base material, and one which is now in widespread use, comprises a nickel plaque. As used herein the term "plaque" refers to an electrically conductive porous structure intended for use as a support for the active material in the nickel electrode of this invention. Conventionally the plaque is made of metal, with the selected metal, in the present instance especially desirably nickel, being in particulate form, the individual particles of which are interconnected to provide a porous mass of desired dimensions and shape. Usually the plaque comprises sintered nickel powder, and for this reason the term "sintered electrode" is frequently used in the art to refer to electrodes made therefrom. Ordinarily, the nickel powder employed in making the plaque is obtained by decomposing nickel carbonyl at elevated temperatures.

After the supporting structure has been prepared, or otherwise provided, the next procedure in the production of the electrode is the impregnation of the plaque with the potentially active material, and involves the steps of soaking or steeping the plaque in a solution of the material, followed by activation of the thus loaded plaque by placing it in a strong alkali solution of either sodium or potassium hydroxide and subjecting it to a cathodic electrolytic process whereby the potentially active material deposited or loaded into the porous plaque is converted into the desired active electrode material. Thereafter the plaque is washed to remove undesired agents and the steps outlined are repeated in sequence two or more times until the plaque has acquired an adequate amount of the active material.

Turning now to the impregnating solution itself, which is directly related to the principal feature of this invention, the same may be described as essentially a mixture of a nickel compound and a barium compound, desirably nickel nitrate and barium nitrate, with the quantity of the barium compound being relatively small as compared with the nickel compound. More particularly, the quantity of the barium compound to be added to the nickel compound is such that the concentration of barium is desirably in the range of about 1 to about 10 atom percent, or, stated differently, about 1 barium atom to every 99 nickel atoms, or 10 barium atoms to every 90 nickel atoms, respectively, with especially desirable results being obtained with a mixture having 5 barium atoms to 95 nickel atoms, giving a barium atom to nickel atom ratio of approximately 1:19. Although it is not intended to exclude greater proportions of the barium compound, the concentration of the barium compound preferably should be confined to limits such that the nickel compound is the most important component of the mixture.

Apart from nickel nitrate, a number of other nickel compounds have utility for the purposes of this invention. Examples of such compounds are nickel acetate, nickel ammonium chloride, nickel chloride, nickel sulfamate, nickel sulfate, and the like.

Similarly, numerous barium compounds find utility in achieving the objectives of this invention, and may be exemplified by such compounds as barium acetate, barium bromide, barium chloride, barium formate, and the like.

In producing the impregnating solutions of this invention, the nickel and barium compounds may be first intermixed and then solubilized in any manner known in the art, or each of the compounds may be separately dissolved and then combined to form the desired mixture. Generally speaking, the compounds are soluble in water, and therefore, the impregnating solutions desirably have an aqueous character. Such solutions have a number of advantages both from an economic standpoint, and their functional aspects. Since they are essentially inert there is no interaction between the solutions and the material of which the plaque is fabricated. In addition, they are easily manipulated with conventional equipment and are generally adequately capable of penetrating the porous matrix comprising the plaque.

Impregnation of the plaque may be accomplished by any of a number of methods known in the art. One such method involves placing the plaque in the solution and applying a suitable vacuum to draw the solution into contact with the interconnected surfaces of the particles of the plaque. Simply soaking or steeping the supporting structure in the solution will also produce satisfactory results in the event it is not convenient to use vacuum apparatus, or such apparatus is unavailable.

Following impregnation, the solution-filled plaque is subjected in a known manner to cathodic polarization in an aqueous electrolyte containing about 25 to 30% sodium or potassium hydroxide. The polarization is generally carried on at an initial temperature of about 100° C. using currents of about 50 amperes. In this operation the nickel compound is converted to the potentially active nickel hydroxide, $Ni(OH)_2$, while the barium compound undergoes conversion to the hydroxide, $Ba(OH)_2$, or oxide, $BaO$, or both. The length of time the plaque remains in the alkali solution may vary considerably. Usually a time period of the order of 10 to 25 minutes is sufficient to effect the desired conversion.

After this operation, the polarized plaque is washed to remove any residual alkali solution. The adequacy and thoroughness of the washing may be suitably monitored by testing the pH of the drippings from the plaque. The plaque is next advantageously dried by any suitable means and the series or cycles of steps, that is, soaking, cathodic polarization, washing, and drying, are repeated two or more times until the plaque has been sufficiently loaded with the desired materials.

The following is an illustrative specific example of the manner of carrying out the method of this invention:

A plaque of sintered nickel was soaked for about 3 minutes in a solution comprising 428 grams of nickel nitrate, $Ni(NO_3)_2 \cdot 6H_2O$ and 21 grams af barium nitrate, $Ba(NO_3)_2$, dissolved in an amount of water to bring the volume to 1 liter. This quantity of nicket nitrate and barium nitrate was sufficient to produce a barium atom to nickel atom ratio of 1:19. The plaque was then placed in a hot 30% caustic soda bath for 15 minutes during which time it was subjected to a cathodic electrolytic process using a current of 50 amperes. The plaque was then removed from the solution, washed until substantially free of the caustic, and dried. This cycle was repeated three more times. The results were as follows:

*Initial specifications of plaque*

(1) Weight _____grams__ 7.9
(2) Porosity _____percent__ 72
(3) Total pore volume _____ml__ 2.4

*Specifications of plaque after processing*

(1) Weight _____ 11.5 grams.
(2) Porosity _____ 30%.
(3) $Ni(OH)_2$—$Ba(OH)_2$ pickup ____ 1.5 grams/ml. of pore volume.

Nickel electrodes produced in accordance with the practice of this invention have a self-discharge rate approximately 50% slower than that of conventionally prepared nickel electrodes. As indicated previously hereinabove, the self-discharging activity of a nickel electrode is manifested by a concurrent evolution of gaseous oxygen. Since the rate of self-discharge of the electrode is a function of the quantity of oxygen released thereat, the rate of self-discharge can be ascertained by correlating it to the quantity of oxygen evolved. In order to normalize comparative data obtained in this manner the amount of oxygen released may be expressed in units of electricity and made a function of the capacity of the electrode. Employing this technique, the rate of self-discharge of an electrode may be determined by measuring the amount of oxygen evolved in such units and plotting this quantity against time.

In order to illustrate results obtained with the barium doped nickel electrode of this invention, reference will now be made to the accompanying drawing wherein the self-discharge curve of a barium doped nickel electrode and that of a conventional nickel electrode are plotted in accordance with the aforementioned technique for comparison purposes. The Curve 1 represents the rate of self-discharge of a nickel electrode containing 5 atom percent of barium, and Curve 2 that of the conventional nickel electrode. It is apparent from this comparison that the rate of self-discharge of the electrode of this invention proceeds at a rate substantially slower than that of the conventional electrode. This marked ability of the barium containing electrode to resist decay of capacity through self-discharge is a performance feature heretofore unattainable with conventionally produced nickel electrodes and has important advantages in electrochemical cells utilizing them as the positive element.

The nickel electrodes produced in accordance with the method of this invention may be used with advantage in such electrochemical cells as, for example, nickel-cadmium alkaline cells. These cells find widespread use in starting diesel, truck and marine engines, and as a power source for railroad signals, fire alarms, communication systems, portable and emergency power units, and in research activities. In cells of this type, the barium doped nickel electrodes of this invention serve to enhance the desirable discharge characteristics of the cell, enabling it to better give a wide range of current drain without excessive voltage fluctuation.

The foregoing detailed description has been given for purposes of explanation only and no unnecessary limitation should be interpreted therefrom, it being understood that numerous changes may be made in the manner of carrying out the invention, all within the spirit of the guiding principles and teachings provided herein.

What we claim as new and desire to protect by Letters Patent of the United States is:

1. A nickel electrode having utility in an electrochemical cell comprising an electrically conductive porous structure composed essentially of interconnected metallic particles having functionally active material within its pores consisting essentially of a hydroxide of nickel and a minor proportion of at least one barium compound selected from the group consisting of barium hydroxide and barium oxide, said barium compound being characterized by being capable of substantially reducing the rate at which capacity decay by way of self-discharge occurs in an electrochemical cell.

2. A nickel electrode having utility in an electrochemical energy storage cell comprising an electrically conductive porous structure composed essentially of nickel and having deposited on its surfaces a functionally active material consisting essentially of a hydroxide of nickel and at least one barium compound selected from the group consisting of barium hydroxide and barium oxide, said barium compound being characterized by being capable of substantially reducing the rate at which capacity decay by way of self-discharge occurs in the nickel electrode in an electrochemical energy storage cell, the barium atoms constituting from 1% to 10% of the nickel atoms in the active material.

3. A nickel electrode structure comprising an electrically conductive porous structure composed essentially of nickel and having deposited on its surfaces a functionally active material consisting essentially of nickel hydroxide and a minor proportion of at least one barium compound selected from the group consisting of barium hydroxide and barium oxide.

4. A nickel electrode comprising an electrically conductive porous nickel structure having deposited on its surfaces a functionally active material consisting essentially of nickel hydroxide and at least one barium compound selected from the group consisting of barium hydroxide and barium oxide, the ratio of barium atoms to nickel atoms in the active material being about 1:19.

5. In combination with an electrochemical cell, a nickel electrode comprising an electrically conductive porous structure having thereon a functionally active material consisting essentially of a hydroxide of nickel and a minor proportion of at least one barium compound selected from the group consisting of barium hydroxide and barium oxide, said barium compound being characterized by being capable of substantially reducing the rate at which capacity decay by way of self-discharge occurs in an electrochemical cell.

6. An electrochemical energy storage cell comprising a positive element and a negative element immersed in an alkaline electrolyte, the positive element comprising an electrically conductive porous structure having therein a functionally active material consisting essentially of a hydroxide of nickel and a minor proportion of at least one barium compound selected from the group consisting of barium hydroxide and barium oxide, said barium compound being characterized by being capable of substantially reducing the rate at which capacity decay by way of self-discharge occurs in the nickel electrode in an electrochemical energy storage cell.

7. An electrochemical energy storage cell comprising a positive element and a negative element immersed in an alkaline electrolyte, the positive element comprising an electrically conductive porous structure composed essentially of interconnected particles of nickel and having functionally active material within its pores consisting essentially of a hydroxide of nickel and a minor proportion of at least one barium compound selected from the group consisting of barium hydroxide and barium oxide, said barium compound being characterized by being capable of substantially reducing the rate at which capacity decay by way of self-discharge occurs in the nickel electrode in an electrochemical energy storage cell.

8. An electrochemical energy storage cell comprising a positive element and a negative element immersed in an alkaline electrolyte, the positive element comprising an electrically conductive porous nickel structure having functionally active material within its pores consisting essentially of nickel hydroxide and at least one barium compound selected from the group consisting of barium hydroxide and barium oxide, the barium atoms constituting from 1 to 10% of the nickel atoms in the active material, said barium compound being characterized by being capable of substantially reducing the rate at which capacity decay by way of self-discharge occurs in the nickel electrode in an electrochemical energy storage cell.

9. An electrochemical energy storage cell comprising a positive element and a negative element immersed in an alkaline electrolyte, the negative element comprising an electrically conductive porous structure having functionally active cadmium thereon, the positive element comprising an electrically conductive porous structure having thereon a functionally active material consisting of a hydroxide of nickel and a minor proportion of at least one barium compound, selected from the group consisting of barium hydroxide and barium oxide, said barium compound being characterized by being capable of substantially reducing the rate at which capacity decay by way of self-discharge occurs in the nickel electrode in an electrochemical energy storage cell.

10. An electrochemical energy storage cell comprising a positive element and a negative element immersed in an alkaline electrolyte, the negative element comprising an electrically conductive porous nickel structure having functionally active cadmium therein, the positive element comprising an electrically conductive porous nickel structure having therein a functionally active material consisting essentially of a hydroxide of nickel and a minor proportion of at least one compound selected from the group consisting of barium hydroxide and barium oxide.

References Cited by the Examiner

UNITED STATES PATENTS

| 917,875 | 4/09 | Junger. |
| 1,640,710 | 8/27 | Miller _____ 136—29 |
| 2,003,609 | 6/35 | Riggs _____ 252—473 |
| 2,042,840 | 6/36 | Haring _____ 136—65 |
| 2,697,730 | 12/54 | Mecorney et al. _____ 252—473 |
| 2,942,050 | 6/60 | Denes _____ 136—120 |
| 2,969,414 | 1/61 | Fleischer _____ 136—29 |

FOREIGN PATENTS 782,394   9/57   Great Britain.

OTHER REFERENCES

Jones: Inorganic Chemistry, 1947, pages 605.

JOHN H. MACK, *Primary Examiner.*

JOHN R. SPECK, MURRAY TILLMAN, *Examiners.*